US008493185B2

(12) United States Patent
Bateman

(10) Patent No.: US 8,493,185 B2
(45) Date of Patent: Jul. 23, 2013

(54) RADIO FREQUENCY IDENTIFICATION READER ANTENNA HAVING A DYNAMICALLY ADJUSTABLE Q-FACTOR

(75) Inventor: Leigh Bateman, Jandowae (AU)

(73) Assignee: Aleis Pty Ltd, Jandowae, Queensland (AU)

( * ) Notice: Subject to any disclaimer, the term of this patent is extended or adjusted under 35 U.S.C. 154(b) by 321 days.

(21) Appl. No.: 12/901,952

(22) Filed: Oct. 11, 2010

(65) Prior Publication Data
US 2011/0205026 A1 Aug. 25, 2011

Related U.S. Application Data

(60) Provisional application No. 61/250,400, filed on Oct. 9, 2009.

(51) Int. Cl.
*G08B 21/00* (2006.01)
(52) U.S. Cl.
USPC ..... 340/10.1; 340/10.2; 340/10.3; 340/572.1; 343/745
(58) Field of Classification Search
USPC .................................. 340/572, 10; 343/745
See application file for complete search history.

(56) References Cited

U.S. PATENT DOCUMENTS

| | | | |
|---|---|---|---|
| 1,744,036 A | 1/1930 | Brard | |
| 2,350,337 A | 6/1944 | Brunner | |

(Continued)

FOREIGN PATENT DOCUMENTS

| | | |
|---|---|---|
| EP | 0783158 B1 | 4/2004 |
| WO | 03/085617 A1 | 10/2003 |

(Continued)

OTHER PUBLICATIONS

International Search Report for International Application No. PCT/US2009/056110, date completed Oct. 21, 2009, date mailed Oct. 29, 2009, 3 pgs.

(Continued)

*Primary Examiner* — Mohammad Ghayour
*Assistant Examiner* — Mark Rushing
(74) *Attorney, Agent, or Firm* — KPPB LLP

(57) ABSTRACT

Turning now to the drawings, systems and methods for reading RFID transponders utilizing readers in which the Q-factor of the resonant antenna of the reader shifts over the course of the reader's interrogation cycle in response to the detection of data from FDX and HDX RFID transponders in accordance with embodiments of the invention are illustrated. One embodiment having a dynamically adjustable Q-factor, wherein the reader transmits an activation signal configured to activate half duplex and full duplex transponders includes a signal source configured to drive a resonant antenna and a dynamic switching circuit configured to set the Q-factor of the resonant antenna to a first value during the transmission of the activation signal. In addition, the dynamic switching circuit is configured to set the Q-factor of the resonant antenna to a second value below the first value during and/or in response to detection of a data signal from a full duplex transponder, the dynamic switching circuit is also configured to set the Q-factor of the resonant antenna to a third value below the second value when the RFID reader is not transmitting the activation signal, and the resonant antenna is multi-filar and the dynamic switching circuit is configured to control the Q-factor of the multi-filar resonant antenna by controlling the filars that are incorporated into the resonant antenna circuit.

19 Claims, 7 Drawing Sheets

U.S. PATENT DOCUMENTS

| | | | |
|---|---|---|---|
| 3,299,424 | A | 1/1967 | Vinding |
| 3,713,146 | A | 1/1973 | Carroll et al. |
| 3,713,148 | A | 1/1973 | Cardullo et al. |
| 3,995,234 | A | 11/1976 | Tuccinardi |
| 4,251,808 | A | 2/1981 | Lichtblau |
| 4,551,712 | A | 11/1985 | Fockens |
| 4,751,516 | A | 6/1988 | Lichtblau |
| 4,776,040 | A | 10/1988 | Ichikawa et al. |
| 4,795,995 | A | 1/1989 | Eccleston et al. |
| 4,999,641 | A | 3/1991 | Cordery et al. |
| 5,053,774 | A | 10/1991 | Schuermann et al. |
| 5,103,235 | A | 4/1992 | Clemens |
| 5,168,282 | A | 12/1992 | Viereck |
| 5,218,343 | A | 6/1993 | Sstobbe et al. |
| 5,289,199 | A | 2/1994 | Viereck |
| 5,289,500 | A | 2/1994 | Inou et al. |
| 5,302,954 | A | 4/1994 | Brooks et al. |
| 5,349,649 | A | 9/1994 | Iijima |
| 5,451,958 | A | 9/1995 | Schuermann |
| 5,517,194 | A | 5/1996 | Carroll et al. |
| 5,530,232 | A | 6/1996 | Taylor |
| 5,602,744 | A | 2/1997 | Meet et al. |
| 5,649,295 | A | 7/1997 | Vannucci et al. |
| 5,914,692 | A | 6/1999 | Bowers et al. |
| 5,952,935 | A | 9/1999 | Mejia et al. |
| 5,963,173 | A | 10/1999 | Lian et al. |
| D416,883 | S | 11/1999 | Wagner et al. |
| 6,137,447 | A | 10/2000 | Saitoh et al. |
| 6,249,212 | B1 | 6/2001 | Beigel et al. |
| 6,353,406 | B1 | 3/2002 | Lanzl et al. |
| 6,434,194 | B1 | 8/2002 | Eisenberg et al. |
| 6,913,201 | B1 | 7/2005 | Wagner et al. |
| 7,028,638 | B2 | 4/2006 | Bonsall |
| 7,197,279 | B2 | 3/2007 | Bellantoni |
| 7,307,529 | B2 | 12/2007 | Gutnik et al. |
| 7,323,977 | B2 | 1/2008 | Kodukula et al. |
| 7,353,997 | B2 | 4/2008 | Tikhov et al. |
| 7,528,725 | B2 | 5/2009 | Stewart |
| 7,936,272 | B2 | 5/2011 | Stewart |
| 2001/0048361 | A1 | 12/2001 | Mays et al. |
| 2003/0132846 | A1 | 7/2003 | Hilliard |
| 2004/0134991 | A1* | 7/2004 | Fletcher et al. ............... 235/491 |
| 2004/0192223 | A1* | 9/2004 | Gardenfors et al. ............ 455/78 |
| 2005/0099269 | A1 | 5/2005 | Diorio et al. |
| 2005/0162276 | A1 | 7/2005 | Balch et al. |
| 2006/0261928 | A1 | 11/2006 | Solberg et al. |
| 2006/0279406 | A1 | 12/2006 | Stewart et al. |
| 2007/0013483 | A1* | 1/2007 | Stewart ........................ 340/10.3 |
| 2007/0046369 | A1 | 3/2007 | Schober et al. |
| 2007/0057797 | A1 | 3/2007 | Waldner et al. |
| 2007/0096875 | A1 | 5/2007 | Waterhouse et al. |
| 2007/0207732 | A1 | 9/2007 | Rofougaran et al. |
| 2007/0276294 | A1 | 11/2007 | Gupta et al. |
| 2008/0012712 | A1 | 1/2008 | Shimizu |
| 2008/0150689 | A1 | 6/2008 | Chiu et al. |
| 2008/0218314 | A1 | 9/2008 | Van Eeden |
| 2008/0280581 | A1 | 11/2008 | Rofougaran et al. |
| 2009/0207027 | A1 | 8/2009 | Banerjee et al. |
| 2011/0210823 | A1 | 9/2011 | Bateman |
| 2011/0210824 | A1 | 9/2011 | Stewart |

FOREIGN PATENT DOCUMENTS

| | | |
|---|---|---|
| WO | 03085617 A1 | 10/2003 |
| WO | 2011044585 A1 | 4/2011 |
| WO | 2011056891 A1 | 5/2011 |

OTHER PUBLICATIONS

Written Opinion of the International Searching Authority for International Application No. PCT/US2009/056110, date completed Oct. 21, 2009, date mailed Oct. 29, 2009, 8 pgs.

International Standard—ISO 11784—Radio-frequency identification of animals—Code structure, Aug. 15, 1996, second edition, 5 pgs.

International Standard—ISO 11785—Radio-frequency identification of animals—Technical concept, ISO 11785, Oct. 15, 1996, First edition, 20 pgs.

Investigating the Effect of Acoustic/Mechanical Interference on Radio Frequency Identity (RFID) Systems Using to Identify Animals Electronically, May 2007—Jul. 2007, Tender Reference: CR/2007/01, 13 pgs.

Barnhardt et al., "Trainer-Mounted RFID Reader Scans EID Tags During Cattle Shipments", Kansas State University Report of Progress 978, Beef Cattle Research, 2007, Title page, pp. 22-24.

International Search Report and Written Opinion for International Application PCT/AAU2010/0013129, Report completed Jan. 24, 2011, 8 pgs.

International Search Report and Written Opinion for International Application No. PCT/US2009/056110, date completed Oct. 21, 2009, date mailed Oct. 29, 2009, 11 pgs.

* cited by examiner

RADIO FREQUENCY IDENTIFICATION READER ANTENNA HAVING A DYNAMICALLY ADJUSTABLE Q-FACTOR

CROSS REFERENCE TO RELATED APPLICATIONS

This application claims priority to U.S. Provisional Application Ser. No. 61/250,400 filed Oct. 9, 2009, the entirety of which is incorporated herein by reference.

FIELD OF THE INVENTION

The present invention relates to radio frequency identification (RFID) systems, and more particularly to RFID readers with resonant antennas.

BACKGROUND

Passive low frequency RFID readers and tags use operating principles that are well-know to those of ordinary skill in the art, and that are described in extensive detail in several seminal inventions, including U.S. Pat. No. 1,744,036 to Brard, U.S. Pat. No. 3,299,424 to Vinding, U.S. Pat. No. 3,713,146 to Cardullo, and U.S. Pat. No. 5,053,774 to Schuermann, and in textbooks such as Finkenzeller, "RFID Handbook" (1999).

International Standards Organization (ISO) Standard 11785, "Radio frequency identification of animals—Technical Concept" (1996) defines the technical principles for communications between reader devices and two types of electronic passive identification transponders. Both transponder types contain identification information stored in binary form, which is conveyed to the reader when a transponder is suitably activated by the reader. ISO 11785 relates to radio frequency identification (RFID) systems, comprising low frequency reader devices and passive, inductively powered identification tags (i.e., "ID tags"). In RFID systems of this type, the reader device generates a tag activation signal, and receives identification data signals from the ID tag. Such a reader device can use separate transmit and receive antenna elements to perform these functions. Additional technical details are provided in ISO Standard 11785, which is incorporated into this disclosure by reference in its entirety.

Readers in which a single antenna performs both transmit and receive functions are very cost effective and efficient, and comprise the most common design implementation in low-frequency RFID readers. However, when a single antenna is used for both transmit and receive purposes, the antenna's design characteristics must be inevitably compromised, and the antenna performs less efficiently than when it can be designed optimally for a single purpose.

A conventional RFID reader including a single resonant antenna is shown in FIG. 1. The RFID reader [100] includes electronic circuitry, which generates an activation signal (usually a single frequency unmodulated signal) using a signal source [101] and an amplifier [102] to drive a resonant antenna circuit [103]. This activation signal is manifested as a time-varying electromagnetic field, which couples with the ID tag [105] by means of the electromagnetic field's magnetic field component [104a]. The ID tag [105] converts this magnetic field into an electrical voltage and current, and uses this electrical power to activate its internal electronic circuitry. Using any of several possible modulation schemes, the ID tag conveys binary encoded information stored within it back to the reader via magnetic field [104b], where the detector and utilization circuit [106] converts this binary code into alphanumeric format tag data [107] in accordance with some prescribed application.

FIG. 2 shows the composition of FIG. 1's resonant antenna circuit [103] in schematic detail within the dashed line [212]. The resonant antenna circuit includes at least one capacitor C [213] connected to at least one inductor L [214], where the values of C and L are selected such that the circuit resonates at the signal source frequency [210] as amplified by amplifier [211]. Inductor L is also constructed in such a manner that it creates a magnetic field [215] within its immediate vicinity.

ISO Standard 11785 defines two types of transponder technologies, which are designated "full-duplex" ("FDX-B") and "half-duplex" ("HDX"). In the described manners that follow, for FDX-B and HDX transponders, respectively, activation energy is transferred to the transponder from the reader, and identification code information is transferred to the reader from the transponder through the mutual coupling of a magnetic field.

The FDX-B transponder communicates to the reader by amplitude modulating the activation signal it receives with a binary pattern representative of the data stored within the tag. Amplitude modulation imposes variations on the activation signal's magnitude, and the reader is equipped with sensing circuitry capable of detecting these magnitude variations. The term "full-duplex" is indicative of the fact that the FDX-B transponder sends its identification code information during the time when it is receiving the activation signal from the reader.

An HDX transponder typically contains its own micro-power radio frequency transmitter, which is powered with energy received from the reader's activation signal and stored internally in a capacitor component. Once the activation signal ceases, the HDX transponder emits a very low strength radio signal, comprising a frequency shift keyed ("FSK") modulation scheme. Specifically, the binary identification code information contained in the HDX tag is serially output such that the occurrence of a binary "1" results in the HDX tag's radio signal being 124.2 KHz and a binary "0" results in the tag's radio signal being 134.2 KHz. The reader detects this FSK signal and derives from it the HDX transponder's identification code. The term "half-duplex" is indicative that the reader and the HDX transponder exchange the activation signal and the identification code signal in alternating time intervals.

An ISO compliant reader has the capability to activate and detect both FDX-B and HDX type transponders when present. To accomplish this, the ISO compliant reader transmits an activation signal, consisting of a 134.2 kilohertz (KHz) sinusoid, which is switched ON and OFF in a prescribed pattern in accordance with ISO 11785. During the interval in which the 134.2 KHz signal is ON, the FDX-B transponder is activated and it transmits its identification code signal cyclically for as long as the activation signal is present. During this ON interval also, an HDX transponder charges its internal capacitor. Subsequently, during the interval in which the 134.2 KHz activation signal is OFF, the FDX-B transponder remains dormant, and the HDX transponder transmits its identification code sequence.

FIGS. 3(a) through 3(c) illustrate the frequency spectrum characteristics of an RFID system conforming with ISO 11785. FIG. 3(a) shows the spectra for the HDX tag, where the activation signal [310] appears at 134.2 KHz, and where the HDX transponder frequencies appear at 124.2 KHz [311] and 134.2 KHz [312]. Since the activation signal and the HDX transponder signals are time interleaved, the 134.2 KHz activation signal [310] and the 134.2 KHz transponder signal

[312] typically do not occur simultaneously. Thus, the reader's receive circuitry is able to detect the transponder frequency without interference from its own activation signal.

FIG. 3(b) shows the spectra for the FDX-B tag, where the activation signal [320] appears at 134.2 KHz, and where the FDX-B transponder's amplitude modulation appears as sidebands [323] close to the 134.2 KHz carrier. As is well known to those of ordinary skill in the art, amplitude modulation sidebands appear symmetrically around the modulated carrier signal, and for FDX-B specifically, these sidebands appear at +2.097 KHz and +4.194 KHz. Because the activation signal [320] and the data signal [323] are distinct frequencies, they can occur simultaneously, and the reader is able to separate the two signals, thus recovering the tag data contained in these sideband frequencies.

In FIG. 3(c), the frequency spectral characteristics from FIG. 3(a) and FIG. 3(b) are shown together, along with curve [335], which characterizes the frequency response of the reader's resonant antenna circuit [212] of FIG. 2. For the resonant antenna circuit to perform well as both transmitter and receiver, and for both HDX and FDX-B tags, the antenna design is typically a compromise. The resulting resonant antenna [212], [335] functions adequately as both transmitter and receiver for HDX and for FDX-B, but in having a fixed Q-factor and a fixed resonant frequency that works for all its functions, it is not optimized for each individual function. For example, in order to be an efficient 134.2 KHz activation signal transmitter, the resonant antenna circuit is ideally characterized by a very high quality factor, or "high-Q", as it is known to those skilled in the art. The "Q-factor" of an inductor used in a resonant circuit (such as the antenna is) describes "sharpness" or "selectivity" of the inductor. Mathematically, the resonant antenna's Q is calculated according to the formula:

$$Q = \frac{2\pi f L}{R} = \frac{(L/C)^{1/2}}{R}$$

where f is the resonant frequency, L is the inductor's inductance value, C is the resonant capacitance, and R is the inductor's resistance. Furthermore, the bandwidth of a resonant antenna circuit using such an inductor is:

$$BW=f/Q$$

Thus, a resonant antenna circuit has a very high-Q when its resistance is very low, but this very high-Q implies a very narrow bandwidth. As shown in FIG. 3(c), a resonant antenna circuit with a very high-Q exhibits a narrow bandwidth as depicted by the curve [336]. A very high-Q resonant antenna circuit is very effective and efficient for transmitting a single frequency activation signal [330], but has insufficient bandwidth to capture the HDX [331], [332] and the FDX-B [333] transponder spectra. Thus, a very high-Q antenna typically does not work satisfactorily as both a transmitter and a receiver antenna.

If the resonant antenna circuit's Q is decreased such that it exhibits the bandwidth depicted by curve [334], the antenna is less efficient in transmitting the activation signal, but provides sufficient bandwidth to capture the FDX-B transponder spectra [333]. However, the lower HDX data frequency at 124.2 KHz [331] lies outside the antenna's response curve, and typically will not be effectively captured.

If the resonant antenna's Q-factor is decreased even further such that it exhibits the bandwidth depicted by curve [335] in FIG. 3(c), this "low-Q" wide-bandwidth characteristic will adequately capture both the HDX [331], [332] and FDX-B [333] transponder spectra, but the antenna does not transmit the activation signal efficiently. Furthermore, this wider bandwidth makes the antenna more susceptible to interference signals from other nearby electromagnetic radiating sources, and this can be especially detrimental to FDX-B performance.

From the curves [334], [335], and [336] in FIG. 3(c), it is apparent that as the resonant antenna's Q-factor is increased to improve transmit efficiency and interference rejection, the antenna becomes less suitable for transponder signal reception. However, if the resonant antenna's Q-factor is dynamically altered, the antenna can function more efficiently as transmitter and receiver for both HDX and FDX-B type transponders.

An improvement to the resonant antenna circuit thus far described is disclosed in U.S. Pat. No. 7,528,725 to Stewart, the fundamental principles of which are reproduced herein in FIGS. 4(a) through 4(d). The '725 Stewart patent proposes the use of a resonant antenna having an intermediate Q-factor, such as that depicted in FIG. 3(c) by curve [334] and in FIG. 4(b) by curves [414] and [415]. During the transponder activation period when FDX-B transponder data is present, the antenna's resonant frequency is set to 134.2 KHz [410], and it's Q-factor provides sufficient bandwidth to capture the FDX-B transponder spectra [413]. When the activation signal ceases, and the HDX transponder signal becomes present, the antenna's resonant frequency is lowered to nominally 129.2 KHz as shown by curve [415], thus allowing the HDX transponder spectra [411], [412] to be captured. The disclosure of U.S. Pat. No. 7,528,725 to Stewart is hereby incorporated by reference in its entirety.

FIG. 4(a) illustrates an electrical circuit that can accomplish the resonant frequency shifting described in the '725 Stewart patent using the activation signal's on/off state. When the activation signal [406] is present, it drives the resonant circuit comprising capacitor C [404] and inductor L [405]. The activation signal bypasses inductor $L_T$ [403] through diodes $D_1$ [401] and $D_2$ [402], and so the resonant frequency of the antenna is determined by the values of C [404] and L [405], which are selected to resonate at 134.2 KHz. When the activation signal is absent, diodes $D_1$ [401] and $D_2$ [402] become high impedances, and thus inductor $L_T$ becomes part of the antenna circuit. The resonant frequency of the antenna is now determined by the values of C [404], L [405], and $L_T$ [403], which are selected to resonate at 129.2 KHz. Thus, as the activation signal [406] is switched on and off, the antenna's resonant frequency dynamically shifts between 134.2 KHz [414] and 129.2 KHz [415].

The '725 Stewart patent also discloses the possible change in Q-factor during the resonant frequency shifting process, as shown in FIGS. 4(c) and 4(d). If inductor $L_T$ [425] has a non-zero resistance value $R_T$ [426], or if a discrete resistive component is inserted into the circuit to create resistance $R_T$ [426], the resulting effect is depicted in FIG. 4(d). During the activation signal on interval, the antenna has a resonant frequency of 134.2 KHz and a Q-factor as shown by curve [434]. When the activation signal is turned off, inductance $L_T$ [425] and resistance $R_T$ [426] are inserted into the antenna's resonant circuit, thus altering the antenna's characteristic to that shown by curve [435] in FIG. 4(d).

SUMMARY OF THE INVENTION

Systems and methods in accordance with embodiments of the invention incorporate resonant antennas that exploit the benefits of alteration of Q-factor during the transponder activation and interrogation interval. In several embodiments, improved reading distance is achieved by dynamically adjusting, during the tag activation and tag data transmission intervals, the antenna's Q-factor, thereby increasing the efficiency of the activation signal, and improving the antenna's effective bandwidth for tag data reception. In various embodiments, the activation signal is a fixed frequency activation signal and the reader is configured to receive transponder signals from ISO compliant HDX and FDX-B signals through the dynamic adjustment of the antenna's Q-factor at various points in the interrogation period.

While the present invention is intended primarily for use in readers that incorporate both types of RFID technologies disclosed in ISO 11785, the invention is also useful in readers equipped with only either one of these technologies. Moreover, while the present invention is primarily and advantageously applicable to readers in which one antenna performs both transmitting and receiving functions, the invention is also applicable to readers having multiple antennas, including readers in which at least one of the antennas performs both transmitting and receiving functions.

One embodiment of the invention includes a signal source configured to drive a resonant antenna, and a dynamic switching circuit configured to set the Q-factor of the resonant antenna to a first value during the transmission of the activation signal. In addition, the dynamic switching circuit is configured to set the Q-factor of the resonant antenna to a second value below the first Q-factor value in response to detection of a data signal from a full duplex transponder.

In a further embodiment, the reader transmits an activation signal configured to activate half duplex and full duplex transponders. In addition, the dynamic switching circuit is also configured to set the Q-factor of the resonant antenna to a third value below the first Q-factor value when the RFID reader is not transmitting the activation signal.

In another embodiment, the second Q-factor value is higher than the third Q-factor value.

In a still further embodiment, the dynamic switching circuit further includes a dynamic tuning network configured to tune the resonant antenna to a first resonant frequency value during transmission of the activation signal and to a second resonant frequency value when the RFID reader is not transmitting the activation signal.

In still another embodiment, the resonant antenna is multi-filar and the dynamic switching circuit is configured to control the Q-factor of the multi-filar resonant antenna by controlling the filars that are incorporated into the resonant antenna circuit.

In a yet further embodiment, the resonant antenna is a tri-filar antenna and the dynamic switching circuit is configured to select the Q-factor of the resonant antenna by incorporating one or more filars into the resonant antenna circuit.

In yet another embodiment, the resonant antenna is a bi-filar antenna, where one of the filars is connected in series with a resistor and the dynamic switching circuit is configured to select the Q-factor of the resonant antenna by incorporating one or more filars into the resonant antenna circuit.

In a further embodiment again, the resonant antenna includes multiple resonant circuits and the dynamic switching circuit is configured to independently drive each of the resonant circuits.

In another embodiment again, the resonant antenna includes a switched resistor and the dynamic switching circuit is configured to set the Q-factor of the resonant antenna using the switched resistor.

A further additional embodiment includes setting the Q-factor of the resonant antenna at a first value during the transmission of an activation signal, decreasing the Q-factor of the resonant antenna during receipt of a data signal from any full duplex transponders present during the transmission of the activation signal, increasing the Q-factor of the resonant antenna to the first value during the remainder of the transmission of the activation signal, and capturing data from the received data signal.

In another additional embodiment, the process further includes interrogating half duplex transponders by decreasing the Q-factor of the resonant antenna upon stopping the transmission of the activation signal, and remaining at a reduced level during receipt of a data signal from any half duplex transponders present.

In a still yet further embodiment, the Q-factor of the resonant antenna during data capture from any full duplex transponders present is greater than the Q-factor of the resonant antenna during data capture from any half duplex transponders present.

In still yet another embodiment, the resonant antenna is a multi-filar antenna.

In a still further embodiment again, setting the Q-factor of the resonant antenna at a first value during the transmission of an activation signal includes incorporating at least two of the filars of the muli-filar antenna into the resonant antenna circuit, decreasing the Q-factor of the resonant antenna during receipt of a data signal from any full duplex transponders present and during the transmission of the activation signal includes incorporating at least one of the filars of the multi-filar antenna into the resonant antenna circuit, and decreasing the Q-factor of the resonant antenna upon stopping the transmission of the activation signal includes incorporating at least one of the filars of the multi-filar antenna into the resonant antenna circuit.

In still another embodiment again, the resonant antenna is a bi-filar antenna, where a resistor is connected in series with one of the filars, setting the Q-factor of the resonant antenna at a first value during the transmission of an activation signal includes incorporating the two filars into the resonant antenna circuit so that the resistor is not incorporated within the resonant antenna circuit, decreasing the Q-factor of the resonant antenna during receipt of a data signal from any full duplex transponders present and during the transmission of the activation signal comprises incorporating a primary filar into the resonant antenna circuit so that the resistor is not incorporated in the resonant antenna circuit, and decreasing the Q-factor of the resonant antenna upon stopping the transmission of the activation signal comprises incorporating the primary filar and the resistor into the resonant antenna circuit.

In a still further additional embodiment, the resonant antenna includes multiple resonant circuits.

In still another additional embodiment, setting the Q-factor of the resonant antenna to a first level comprises driving at least two of the resonant circuits during the transmission of an activation signal.

In a yet further embodiment again, the resonant antenna includes a switched resistor.

In yet another embodiment again, decreasing the Q-factor of the resonant antenna upon stopping the transmission of the activation signal comprises switching the resistor into the resonant antenna circuit.

A yet further additional embodiment also includes tuning the resonant antenna to a first resonant frequency value during transmission of the activation signal, and tuning the resonant antenna to a second resonant frequency value when the RFID reader is not transmitting the activation signal.

Yet another additional embodiment includes a signal source configured to drive a resonant antenna, and a dynamic switching circuit configured to set the Q-factor of the resonant antenna to a first value during the transmission of the activation signal. In addition, the dynamic switching circuit is configured to set the Q-factor of the resonant antenna to a second value below the first value in response to detection of a data signal from a full duplex transponder, the dynamic switching circuit is also configured to set the Q-factor of the resonant antenna to a third value below the second value when the RFID reader is not transmitting the activation signal, and the resonant antenna is multi-filar and the dynamic switching circuit is configured to control the Q-factor of the multi-filar resonant antenna by controlling the filars that are incorporated into the resonant antenna circuit.

BRIEF DESCRIPTION OF THE FIGURES

FIG. 3(c) illustrates the signal spectra of FIGS. 3(a) and 3(b) with respect to the characteristic frequency responses of three different reader resonant antennas.

DETAILED DESCRIPTION OF THE INVENTION

Turning now to the drawings, systems and methods for reading RFID transponders utilizing readers in which the Q-factor of the resonant antenna of the reader shifts over the course of the reader's interrogation cycle in response to the detection of data from FDX and HDX RFID transponders in accordance with embodiments of the invention are illustrated. In several embodiments, a high Q-factor is used during the transmission of an activation signal and is shifted to a lower Q-factor in response to the detection of data from an FDX tag. In many embodiments, the Q-factor is further reduced during periods in which the activation signal is absent and in which data is detected from an HDX tag. In a number of embodiments, the RFID reader adjusts the Q-factor of its resonant antenna by switching conductors in a multi-filar antenna. In several embodiments, the RFID reader also adjusts the tuning of the resonant antenna during the interrogation cycle. In further embodiments, variations in Q-factor are achieved using a plurality of resonant circuits. In many embodiments, a series resistance is switched in and out of a resonant antenna circuit to vary Q-factor. RFID readers and processes for shifting the Q-factor of a resonant antenna of an RFID reader in accordance with embodiments of the invention are discussed further below.

Processes for Reading RFID Transponders

Figure 1:
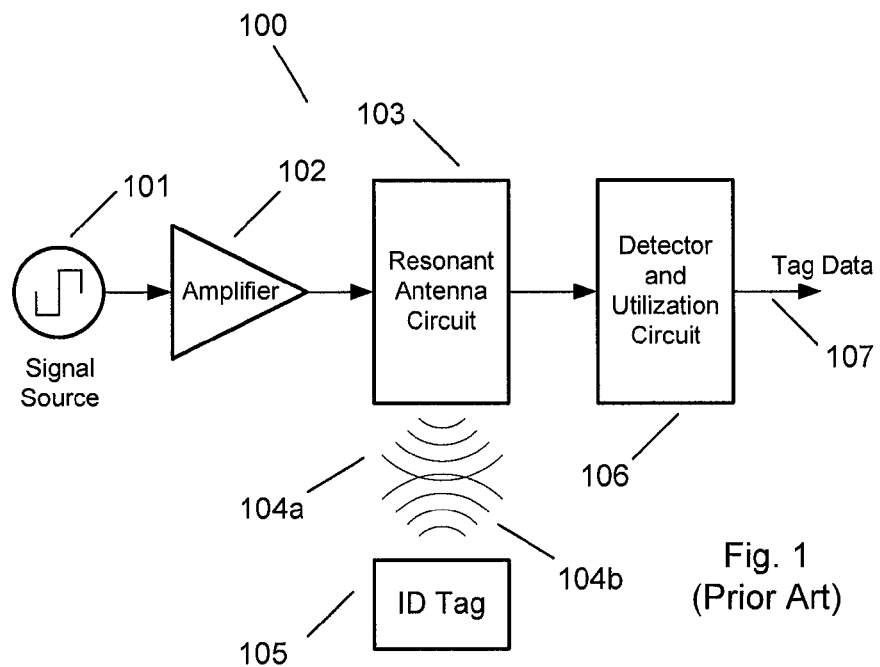
FIG. 1 illustrates the basic components of a conventional passive RFID system.
Figure 2:
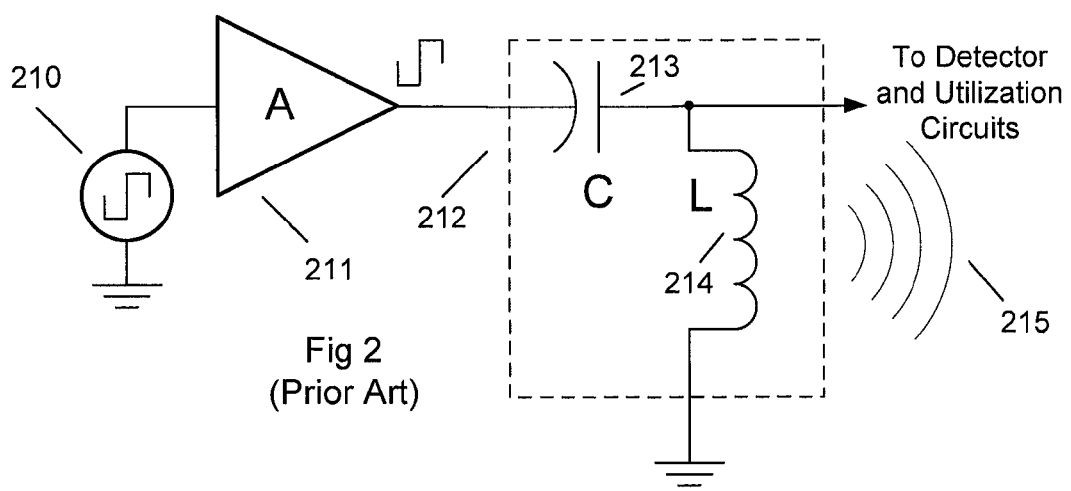
FIG. 2 illustrates a resonant antenna circuit for a single antenna coil reader
Figure 3A:
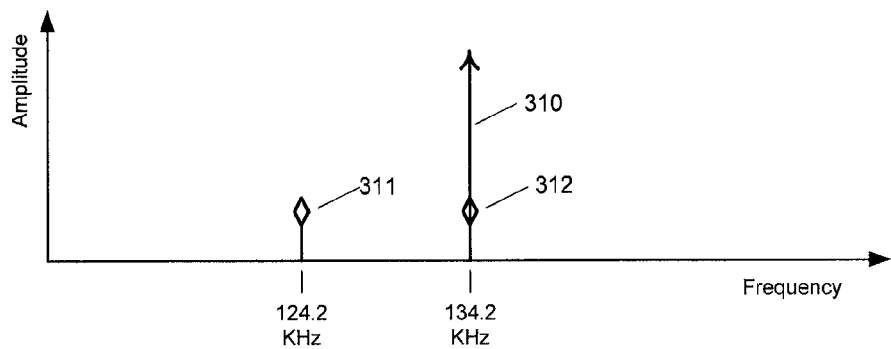
FIGS. 3(a) through 3(c) illustrate the frequency spectra of a reader's activation signal and transponder signal frequencies for HDX and FDX-B transponders.
Figure 3B:
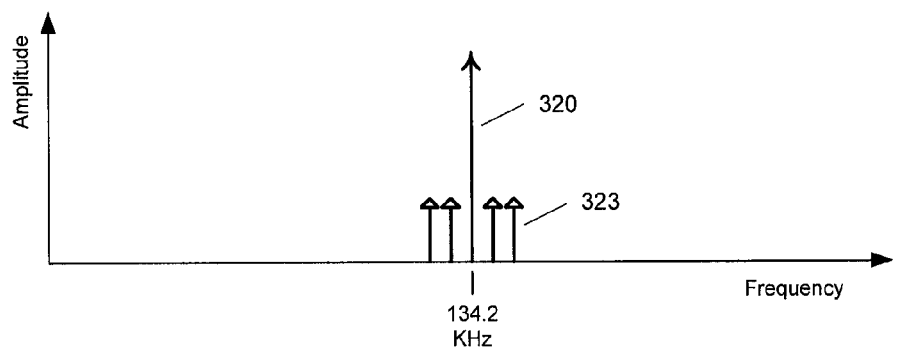
Figure 3C:
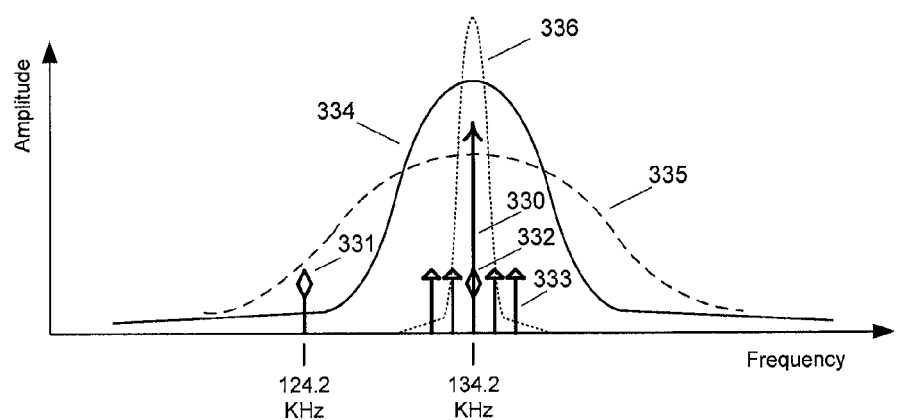
Figure 5A:
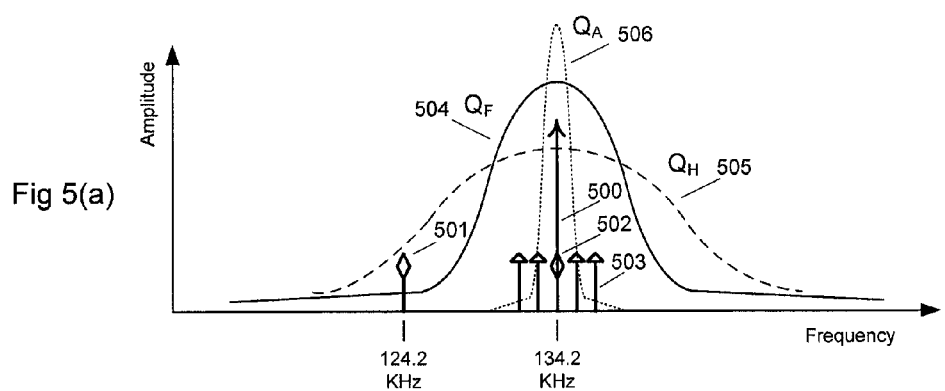
FIG. 5(a) illustrates three Q-factor response curves for resonant antenna circuits in accordance with embodiments of the invention.

FIG. 5(a) reproduces the resonant antenna response curves illustrated in FIG. 3(c), as they relate to the present invention. In FIG. 5(a), curve $Q_A$ [506] represents a high Q-factor associated with an antenna whose bandwidth is sufficient for transmitting the activation signal frequency [500], but that has insufficient bandwidth for optimal reception of either FDX-B data signal frequencies [503] or HDX data signal frequencies [501], [502].

Curve $Q_F$ [504] in FIG. 5(a) exhibits an intermediate Q-factor, being less efficient for transmitting the activation signal [500], but having sufficient bandwidth for captuOng the FDX-B data frequencies [503] and having insufficient bandwidth for capturing of the lower HDX signal frequency [501]. Curve $Q_H$ [505] exhibits a low Q-factor, which is even less efficient than curve $Q_F$ [504] for transmitting the activation signal [500], but which now has sufficient bandwidth to capture both HDX data frequencies [501], [502].

While curve $Q_H$ [505] also adequately captures FDX-B data frequencies [503], curve $Q_F$ [504] is preferable inasmuch as curve $Q_F$ [504] exhibits higher gain and less bandwidth, both of which improve the signal-to-noise ratio of the FDX-B data frequencies [503].

Processes for reading RFID transponders in accordance with several embodiments of the invention involve shifting the Q-factor of the resonant antenna(s) of the reader between Q-factors of $Q_A$, $Q_F$, and $Q_H$ respectively. Although much of the following discussion is written from the perspective of changing the Q-factor of a single resonant antenna, RFID readers in accordance with embodiments of the invention can utilize more than one resonant antenna and many RFID readers in accordance with embodiments of the invention utilize three resonant antennas having Q-factors of $Q_A$, $Q_F$, and $Q_H$. By utilizing different Q-factors during different phases of an interrogation cycle, RFID readers in accordance with embodiments of the invention can achieve significantly increased read ranges. In the context of ISO 11785, the shifting scheme over the course of the interrogation cycle involves the following sequence:

(a) Set to level $Q_A$ [506] at the commencement of activation signal ON (b) Decrease to level $Q_F$ [504] during activation signal ON and FDX-B data capture (c) Set back to level $Q_A$ [506] for the remainder of activation signal ON (d) Set to level $Q_H$ [505] at the commencement of activation signal OFF (e) Remain at level $Q_H$ [505] during HDX data capture and activation signal OFF In the aforesaid manner, the resonant antenna's Q-factor to be adjusted to improve its performance for transmit and receive purposes. Examples of the utilization of different resonant antenna Q-factors during various interrogation cycles and different implementations of RFID readers in accordance with embodiments of the invention are discussed below.

An Exemplary Interrogation Cycle

Figure 5B:
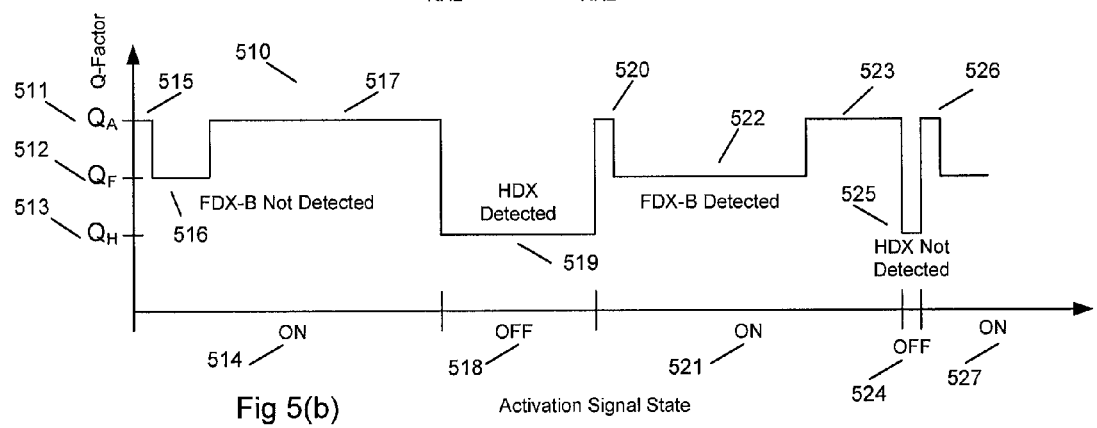
FIG. 5(b) illustrates a method of Q-factor variation over the course of the reader's interrogation cycle in accordance with an embodiment of the invention.

Variation of resonant antenna Q-factor [510] over the course of several interrogation cycles and as a function of transponder data detection in accordance with an embodiment of the invention is illustrated in FIG. 5(b). The interrogation cycle illustrated in FIG. 5(b) is in accordance with ISO 11785. The vertical axis of FIG. 5(b) represents the Q-factor on which three relative levels $Q_A$ [511], $Q_F$ [512], and $Q_H$ [513] are indicated. The horizontal axis represents the state of the activation signal as being either on or off.

At the commencement of activation signal on interval [514], the resonant antenna Q-factor is initially set to its highest level $Q_A$ [511] for a brief interval [515], which typically occurs for only a few milliseconds. The associated highest activation signal level provides the maximum magnetic field strength for activating a transponder within the antenna's vicinity. Thereafter, the antenna Q-factor is decreased to an intermediate level $Q_F$ [512] for a period of time [516] during which the reader searches for a valid FDX-B data signal.

In this first interrogation cycle on period [514], it is assumed an FDX-B transponder is not present, and therefore no FDX-B data signal is detected. Consequently, the resonant antenna Q-factor is shifted back to its maximum value $Q_A$ [511] in order to produce the maximum magnetic field strength for activating an HDX transponder, inasmuch as one might be present within the antenna's vicinity. At the end of the activation signal on period [514], which is typically 50 milliseconds in duration (but which can be as long as 100 milliseconds), the activation signal is extinguished for the duration of the off interval [518], and the resonant antenna Q-factor is synchronously shifted to its lowest level $Q_H$ [513]. During this interval [519], it is assumed an HDX transponder is present and detected, and so the Q-factor is sustained at $Q_H$ for a period of nominally 20 milliseconds during which the HDX tag data is captured.

At the end of the activation signal off interval [518], the resonant antenna Q-factor is shifted back to its highest level $Q_A$ [511] at the commencement of activation signal ON interval [521], as shown at point [520]. Again, as with initial interval [515], interval [520] is maintained typically for a short duration of only several milliseconds. Thereafter, the Q-factor is decreased to level $Q_F$ [512] as shown by interval [522]. This time, an FDX-B transponder is detected, and the Q-factor is maintained at level $Q_F$ [512] sufficiently long [522] such that the entire FDX-B data contents are captured. Subsequently, the Q-factor is increased to level $Q_A$ [511] for the remainder [523] of the activation signal on state [521].

At the end of activation signal on period [521], the activation signal is again extinguished during off interval [524], and the Q-factor is shifted to level $Q_H$ [513], as shown at point [525]. No HDX transponder is detected this time, and so the activation signal is returned to an on state [527], and the Q-factor is increased back to $Q_A$ [511] as shown at point [526].

The two interrogation cycles as described in FIG. 5(b) typify the general behavior of the Q-factor shifting technique. Other interrogation cycle patterns may occur, depending on the particular transponders detected, and the time required to capture the detected transponder data.

Selection of Q-Factors

The specific Q-factors assigned to each of the three levels—$Q_A$ [505], $Q_F$ [504], and $Q_H$ [505]—can be determined experimentally, and are often dependent upon the transmitter and receiver characteristics. The basic relationship $Q_A$ [505] >$Q_F$[504]>$Q_H$[505], however, holds true. In one such design, the Q-factor values can be set to $Q_A$[505]=120, $Q_F$[504]=40, and $Q_H$[505]=35. In several embodiments, the value of QF is selected to be between 25 and 35. In other embodiments, the specific range that is used for the Q-factor values during different stages of an interrogation cycle are chosen in accordance with the requirements of a specific application.

Implementations of Shifting Q-Factor Resonant Antennas

Figure 6A:
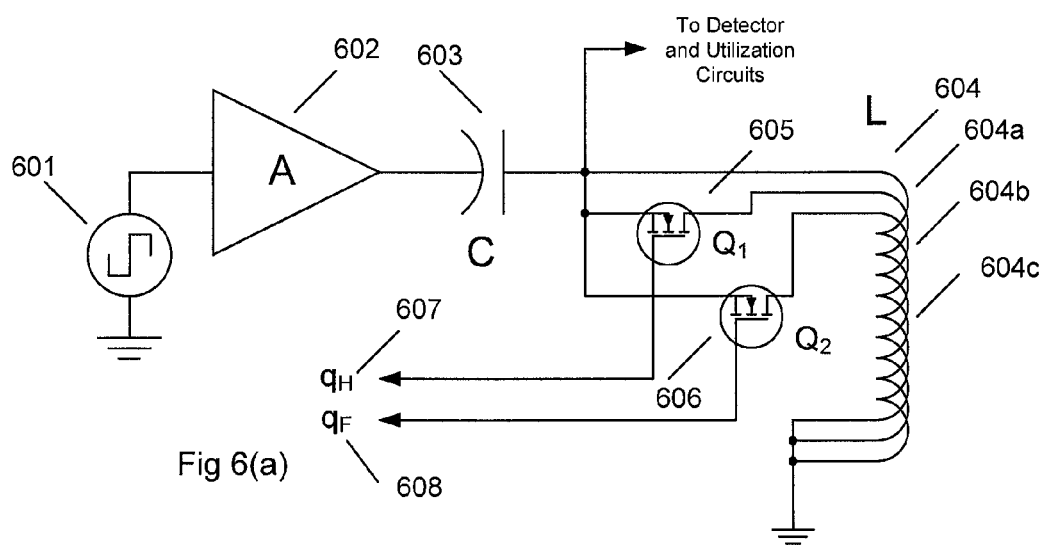
FIGS. 6(a) and 6(b) illustrate electrical schematic diagrams for two RFID reader circuits configured to vary resonant antenna Q-factor in accordance with embodiments of the invention.
Figure 6B:
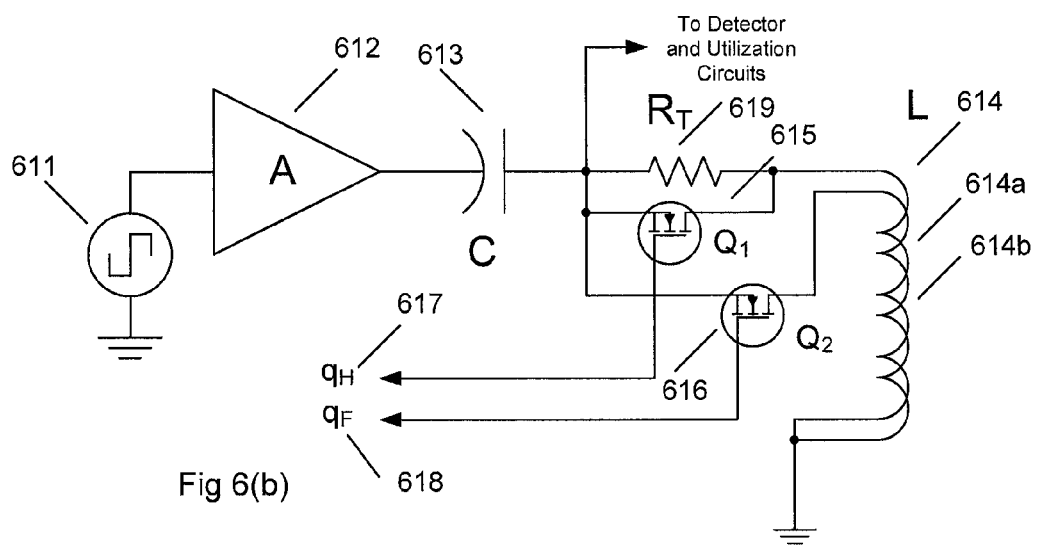

Several circuit design techniques can be used to implement a Q-factor shifting process in accordance with an embodiment of the invention. Two appropriate circuit designs in accordance with embodiments of the invention are illustrated in FIGS. 6(a) and 6(b). (Note: The MOSFET switching arrangements illustrated in FIGS. 6 and 7 are simplified for the purpose of conveying conceptual operation. Persons of ordinary skill in the art are capable of selecting appropriate MOSFET devices and designing circuits in accordance with manufacturer device specifications that achieve the functional behavior described.) In FIG. 6(a), the reader circuit includes a signal source [601], which is amplified by an amplifier [602] that provides an output to drive a resonant antenna. The resonant antenna includes a capacitor C [603] and an inductor L [604]. The inductor L includes an antenna coil wound with three conductors that are mutually electrically insulated, which can be referred to as a "tri-filar" antenna, or more generally, as a "multi-filar" antenna. The electrical conductors comprising this tri-filar antenna may be identical, or may have various diameters, in any requisite configuration so as to produce the desired inductance and Q-factors. The first conductor [604a] of the tri-filar antenna is directly connected to the capacitor C [603], while the second conductor [604b] and third conductor [604c] are connected to the capacitor C [603] through MOSFET transistor devices $Q_1$ [605] and $Q_2$ [606], respectively. The MOSFET transistor devices $Q_1$ [605] and $Q_2$ [606] have control lead connections $q_H$ [607] and $q_F$ [608], respectively, which determine the on/off states of each MOSFET. When either $Q_1$ [605] or $Q_2$ [606] is in an on state, the antenna's second conductor [604b] or third conductor [604c] respectively, are connected to capacitor C [603] and are included in the resonant antenna circuit. Conversely, when either $Q_1$ [605] or $Q_2$ [606] is in an "off" state, the antenna's resonant second conductor [604b] or third conductor [604c] respectively, are disconnected from the capacitor C [603] and are excluded from the resonant antenna circuit.

Q-factor level $Q_A$ [506] is established by placing both $Q_1$ [605] and $Q_2$ [606] in an on state, thus connecting all three antenna coil conductors [604a], [604b], and [604c] to capacitor C [603]. So connected, these three antenna coil conductors appear electrically wired in parallel, resulting in the lowest impedance and highest Q-factor. Q-factor level $Q_F$ [504] is established by placing $Q_1$ [605] in an on state and $Q_2$ [606] in an off state, thus connecting in parallel only the first conductor [604a] and the second conductor [604b] to capacitor C [603]. Q-factor level $Q_H$ [505] is established by placing both $Q_1$ [605] and $Q_2$ [606] in an off state, thus connecting only the first conductor [604a] to capacitor C [603].

In the scheme depicted in FIG. 6(a), and described above, use the following configurations of the tri-filar conductors:
  Q-factor $Q_A$ [506]=conductors [604a]+[604b]+[604c]
  Q-factor $Q_F$ [504]=conductors [604a]+[604b]
  Q-factor $Q_H$ [505]=conductor [604a]

It can be appreciated that other combinations of conductors can be used, such as:
  Q-factor $Q_A$ [506]=conductors [604a]+[604b]+[604c]
  Q-factor $Q_F$ [504]=conductors [604a]+[604b]
  Q-factor $Q_H$ [505]=conductor [604a]+[604c]

Alternately, the antenna could comprise only two conductors, [604a] and [604b], such that:
  Q-factor $Q_A$ [506]=conductors [604a]+[604b]
  Q-factor $Q_F$ [504]=conductors [604a]
  Q-factor $Q_H$ [505]=conductor [604b]

In one embodiment, the selection of a particular number and combination of conductors that achieve the optimum design values for Q-factors $Q_A$ [506], $Q_F$ [504], and $Q_H$ [505]

is performed by practicable limitations of antenna construction. However, all such conductor combinations and permutations appropriate to a specific application can be utilized in accordance with embodiments of the invention.

FIG. 6(b) presents an alternate embodiment for realizing the Q-factor shifting technique. The circuit of FIG. 6(b) operates very similarly to the circuit in FIG. 6(a), except that the Q-factor is partially established using a resistor $R_T$ [619]. In FIG. 6(b), when both MOSFETs $Q_1$ [615] and $Q_2$ [616] are on, the resonant antenna is a "bi-filar" antenna inductor L [614] in which a first conductor [614a] and a second conductor [614b] are connected in parallel and wired to the capacitor C [613], such that Q-factor $Q_A$ [506] is established. The on state of $Q_1$ [615] which connects the first conductor [614a] to the capacitor C also bypasses resistor $R_T$ [619] such that it is excluded from the antenna circuit. When the device $Q_1$ [615] remains on and the device $Q_2$ [616] is off, the resonant antenna only includes the first conductor [614a] connected to the capacitor C [613], and Q-factor $Q_F$ [504] is established. Finally, when both devices Q1 [615] and Q2 [616] are "off", the resonant antenna comprises conductor [614a] connected in series with the resistor $R_T$ [619], and connected to the capacitor C [613], thus establishing the lowest Q-factor $Q_H$ [505].

Accordingly, the antenna Q-factor is determined by the configurations:

Q-factor $Q_A$ [506]=conductors [604a]+[604b]
Q-factor $Q_F$ [504]=conductor [604a]
Q-factor $Q_H$ [505]=conductor [604a]+resistor $R_T$ [619]

It is practicable to implement Q-factor $Q_H$ [505] using the resistor $R_T$ [619] insertion method shown in FIG. 6(b) inasmuch as resistor $R_T$ [619] appears in the resonant antenna circuit only during the activation signal OFF interval, and thus is not required to dissipate any substantial amount of power from the activation signal. While Q-factor $Q_F$ [504] could be obtained through a comparable resistor insertion technique, as an alternative to the bi-filar inductor L [614] second conductor [614b], such a Q-factor shifting method can require substantial power dissipation capability in the resistor, which can present a heat dissipation problem and a potential component reliability issue.

The schematics of FIGS. 6(a) and 6(b) are simply examples of circuits capable of implementing Q-factor shifts in accordance with embodiments of the present invention. As can readily be appreciated, alternate circuits that accomplish the same results can also be implemented. For example, each of the multi-filar conductors of the antenna could be driven from an individual amplifier, with the activation signal source to each amplifier controlled by signals $q_H$ [607] and $q_F$ [608].

Combining Q-Factor Shifting with Resonant Antenna Tuning

Figure 7A:
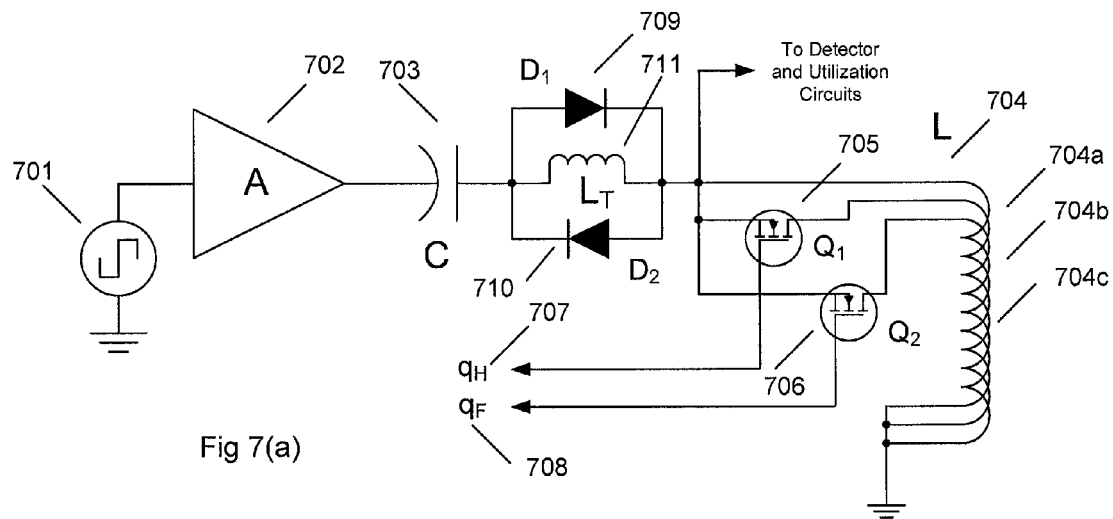
FIGS. 7(a) and 7(b) illustrate how the Q-factor variation technique of the present invention as shown in FIGS. 6(a) and 6(b) can be combined with dynamic tuning in accordance with embodiments of the invention.
Figure 7B:
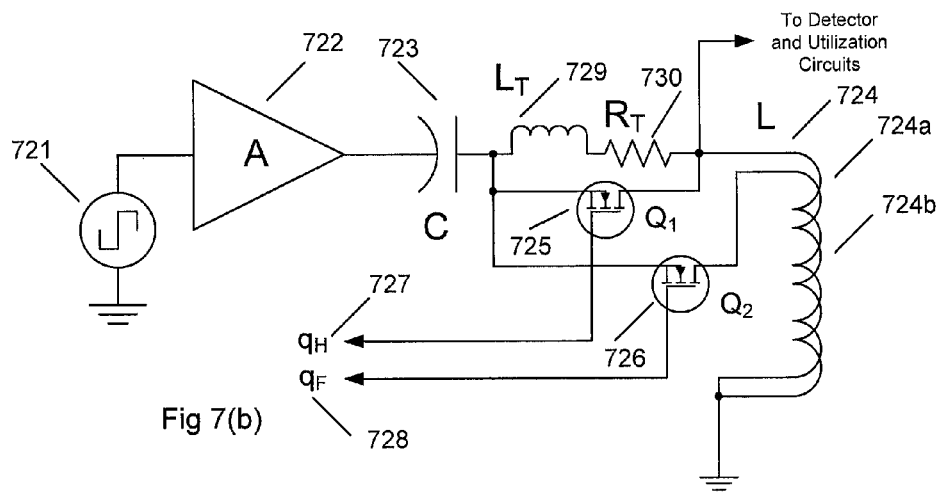

As a further performance improvement to the present invention, the Q-factor shifting technique can be combined with shifting the tuning of the resonant antenna circuit, and thereby obtaining compounded performance benefits. FIGS. 7(a) and 7(b) illustrate two reader circuits that combine Q-factor shifting with tuning of a resonant antenna circuit in accordance with embodiments of the invention, and FIG. 7(c) illustrates the corresponding antenna response characteristic.

In FIG. 7(a), the Q-factor shifting circuit of FIG. 6(a) is modified to incorporate the parallel combination of diode components $D_1$ [709], $D_2$ [710], and an inductor $L_T$ [711] inserted in series between the antenna inductor L [704] and capacitor C [703]. Antenna inductor L [704] has the same tri-filar construction as the inductor L [604] previously described in relationship to FIG. 6(a), and the Q-factor of the antenna is controlled in the same fashion by signals $q_H$ [707] and $q_F$ [708].

Figure 4A:
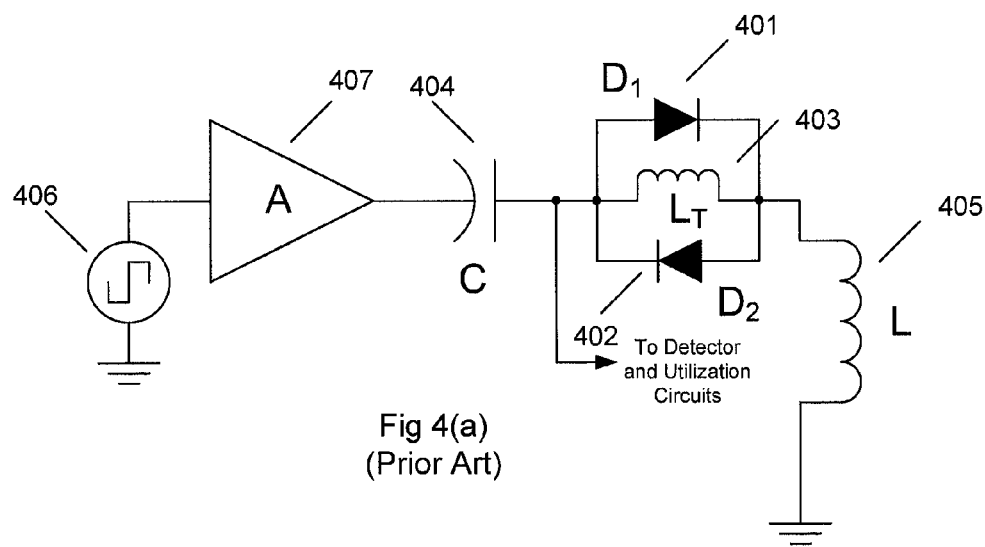
FIGS. 4(a) through 4(d) illustrate prior art methods that alter the resonant frequency and the Q-factor of the resonant antenna circuit in synchronization with the activation signal's on/off state.
Figure 4B:
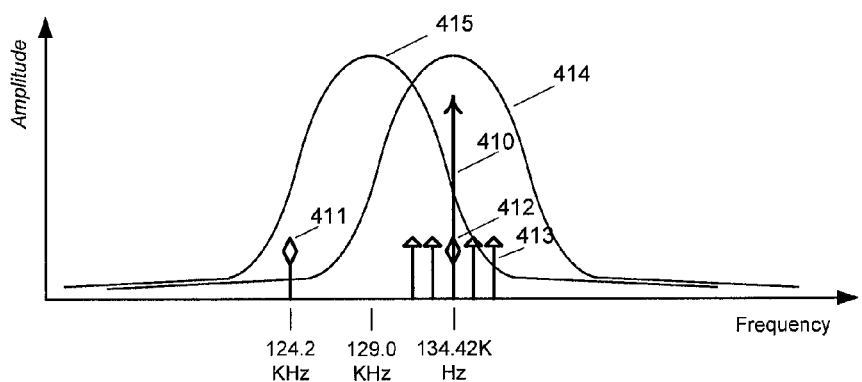
Figure 4C:
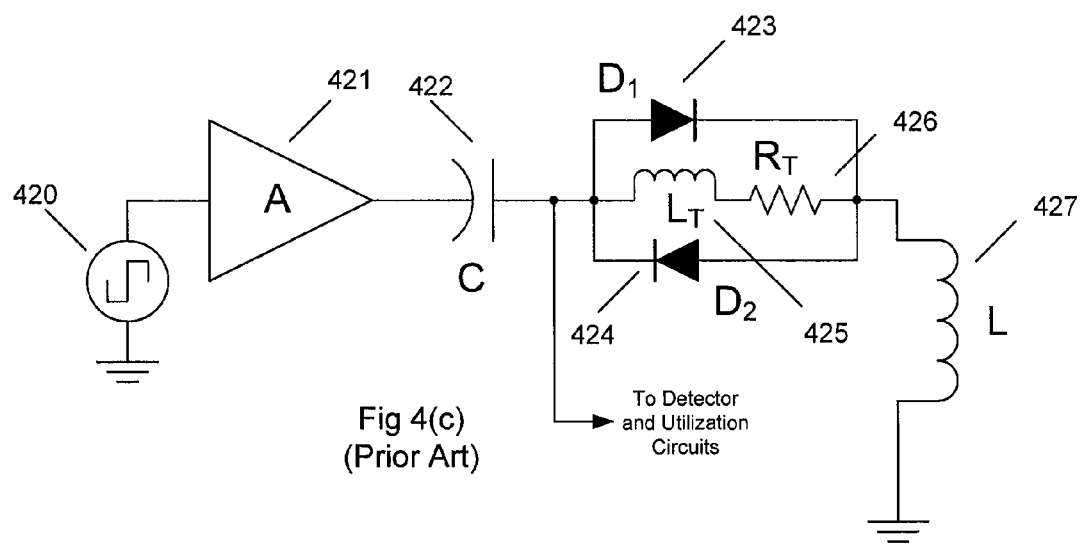
Figure 4D:
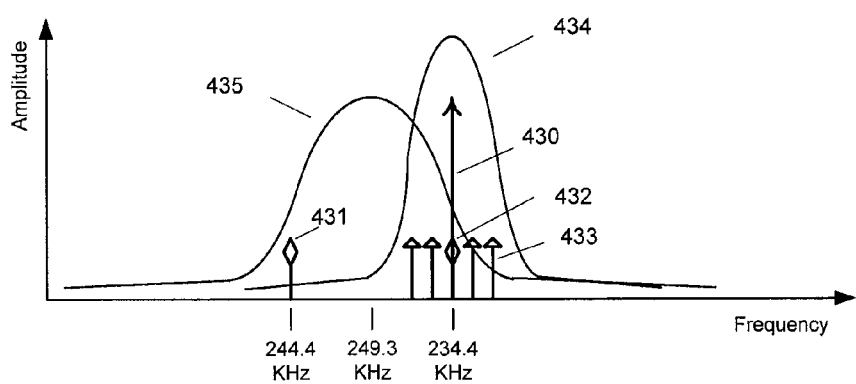
Figure 7C:
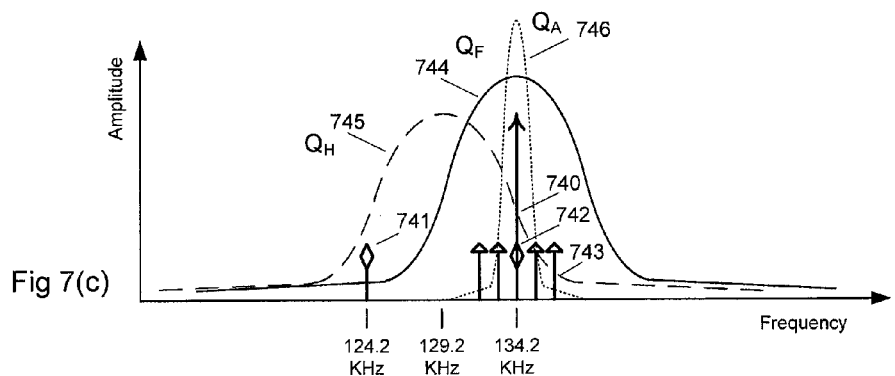
FIG. 7(c) illustrates how the resonant antenna's response curve behaves with dynamic tuning as compared to FIG. 5(a).

FIG. 7(c) illustrates the resonant antenna's [704] characteristics that result from the combined effects of Q-factor shifting and resonant frequency shifting. As with FIGS. 6(a) and 6(c), there are three Q-factor levels, $Q_A$ [746], $Q_F$ [744], and $Q_H$ [745] that are invoked during the interrogation cycle as was previously described in relationship to FIG. 5(b). However, in FIG. 7(c), when Q-factor $Q_H$ [745] is invoked, it is accompanied by a shift in the resonant antenna's [704] tuning to 129.2 KHz from its nominal 134.2 KHz tuning point. This shift in tuning occurs as a result of the same process that was previously described in relationship to FIGS. 4(a) and 4(b), and which is more comprehensively described in the '725 Stewart patent, and results from the inclusion of inductor $L_T$ [711] in the circuit.

FIG. 7(b) offers an alternate embodiment, based on the Q-factor shifting circuit shown in FIG. 6(b). The circuit of FIG. 7(b) operates identically to that in FIG. 6(b) with the exception that resistor $R_T$ [730] is coupled in series with inductor $L_T$ [729]. Thus, in addition to the effect of decreasing the Q-factor to $Q_H$ [505] through the insertion of resistor R [619] in FIG. 6(b), there is also the insertion of inductor $L_T$ [729]. The combined effect of inserting inductor $L_T$ [729] in combination with resistor $R_T$ [730] produces a resonant antenna Q-factor shift and the resonant frequency shift shown by curve $Q_H$ [745] in FIG. 7(c).

With the combined Q-factor shift and resonant frequency shift effects, it is apparent that the Q-factor $Q_H$ [745] in FIG. 7(c) may have a different value for optimum performance than the Q-factor $Q_H$ [505] in FIG. 5(a). Again, in various embodiments, the optimum Q-factors for $Q_A$ [746], $Q_F$ [744], and $Q_H$ [745] are dependent on other circuit design considerations in the reader, including especially the receive circuit characteristics, and are determined experimentally.

Although the present invention has been described in certain specific aspects, many additional modifications and variations would be apparent to those skilled in the art. It is therefore to be understood that the present invention may be practiced otherwise than specifically described, including various changes in the implementation such as utilizing readers and transponders that support features beyond those specified within a particular standard with which they comply, without departing from the scope and spirit of the present invention. For example, although many of the resonant antenna circuits described above show different filars driven by a single source using switches, equivalent resonant antenna circuits can be utilized that use separate sources or separate amplifier circuits to drive each filar in a multi-filar antenna. Thus, embodiments of the present invention should be considered in all respects as illustrative and not restrictive.

What is claimed is:

1. A reader circuit for a radio frequency identification (RFID) reader having a dynamically adjustable Q-factor, wherein the reader transmits an activation signal configured to activate half duplex and full duplex transponders, the reader circuit comprising:

a signal source configured to drive a resonant antenna; and a dynamic switching circuit configured to set the Q-factor of the resonant antenna to a first value during the transmission of the activation signal;

wherein the resonant antenna is a multi-filar antenna comprising a primary filar and a set of secondary filars and a resistor is connected in series with at least one of the filars in the multi-filar antenna;

wherein the dynamic switching circuit is configured to set the Q-factor of the resonant antenna to a second value below the first value during detection of a data signal from a full duplex transponder;

wherein the dynamic switching circuit is configured to set the Q-factor of the resonant antenna to a third value below the second value when the RFID reader is not transmitting the activation signal; and wherein the dynamic switching circuit is configured to control the Q-factor of the multi-filar resonant antenna by controlling the filars that are incorporated into the resonant antenna circuit by:

setting the Q-factor of the resonant antenna at a first value during the transmission of an activation signal comprises incorporating at least two of the filars into the resonant antenna circuit so that the resistor is not incorporated within the resonant antenna circuit;

decreasing the Q-factor of the resonant antenna during receipt of a data signal from any full duplex transponders present and during the transmission of the activation signal comprises incorporating a primary filar into the resonant antenna circuit so that the resistor is not incorporated in the resonant antenna circuit; and decreasing the Q-factor of the resonant antenna upon stopping the transmission of the activation signal comprises incorporating the primary filar and the resistor into the resonant antenna circuit.

2. The reader circuit of claim 1, wherein the dynamic switching circuit is configured to set the Q-factor of the resonant antenna to a third value below the first Q-factor value when the RFID reader is not transmitting the activation signal.

3. The reader circuit of claim 2, wherein the second Q-factor value is higher than the third Q-factor value.

4. The reader circuit of claim 2, wherein the dynamic switching circuit further includes a dynamic tuning network configured to tune the resonant antenna to a first resonant frequency value during transmission of the activation signal and to a second resonant frequency value when the RFID reader is not transmitting the activation signal.

5. The reader circuit of claim 2, wherein the dynamic switching circuit is configured to control the Q-factor of the multi-filar resonant antenna by controlling the filers that are incorporated into the resonant antenna circuit.

6. The reader circuit of claim 5, wherein the resonant antenna is a tri-filar antenna.

7. The reader circuit of claim 5, wherein the resonant antenna is a bi-filar antenna.

8. The reader circuit of claim 2, wherein the resonant antenna includes multiple resonant circuits and the dynamic switching circuit is configured to independently drive each of the resonant circuits.

9. The reader circuit of claim 2, wherein the resonant antenna includes a switched resistor and the dynamic switching circuit is configured to set the Q-factor of the resonant antenna using the switched resistor.

10. A process for interrogating full duplex transponders using a radio frequency identification (RFID) reader having a resonant circuit with a dynamically adjustable Q-factor, comprising:

setting the Q-factor of a resonant antenna at a first value during the transmission of an activation signal, wherein:

the resonant circuit comprises a resonant antenna and the resonant antenna is a multi-filar antenna comprising a primary filar and a set of secondary filars and a resistor is connected in series with at least one of the filars in the multi-filar antenna; and setting the Q-factor of the resonant antenna at a first value during the transmission of an activation signal comprises incorporating at least two filars in the multi-filar antenna into the resonant antenna circuit so that the resistor is not incorporated within the resonant antenna circuit;

decreasing the Q-factor of the resonant antenna during receipt of a data signal from any full duplex transponders present during the transmission of the activation signal by incorporating the primary filar into the resonant antenna so that the resistor is not incorporated in the resonant antenna;

increasing the Q-factor of the resonant antenna to the first value during the remainder of the transmission of the activation signal;

capturing data from the received data signal; and decreasing the Q-factor of the resonant antenna upon stopping the transmission of the activation signal by incorporating the primary filar and the resistor into the resonant antenna circuit.

11. The process of claim 10, wherein the process further comprises interrogating half duplex transponders by remaining at a reduced level during receipt of a data signal from any half duplex transponders present.

12. The process of claim 11, wherein the Q-factor of the resonant antenna during data capture from any full duplex transponders present is greater than the Q-factor of the resonant antenna during data capture from any half duplex transponders present.

13. The process of claim 11, wherein the resonant antenna includes multiple resonant circuits.

14. The process of claim 13, wherein setting the Q-factor of the resonant antenna to a first level comprises driving at least two of the resonant circuits during the transmission of an activation signal.

15. The process of claim 11, wherein the resonant antenna includes a switched resistor.

16. The process of claim 15, wherein decreasing the Q-factor of the resonant antenna upon stopping the transmission of the activation signal comprises switching the resistor into the resonant antenna circuit.

17. The process of claim 11, further comprising:

tuning the resonant antenna to a first resonant frequency value during transmission of the activation signal; and tuning the resonant antenna to a second resonant frequency value when the RFID reader is not transmitting the activation signal.

18. The process of claim 10, wherein the resonant antenna is a tri-filar antenna.

19. The process of claim 10, wherein:

the resonant antenna is a bi-filar antenna.

* * * * *